(12) United States Patent
Kunieda et al.

(10) Patent No.: US 8,685,331 B2
(45) Date of Patent: *Apr. 1, 2014

(54) HONEYCOMB STRUCTURAL BODY AND EXHAUST GAS CONVERSION APPARATUS

(75) Inventors: Masafumi Kunieda, Gifu (JP); Yuki Fujita, Gifu (JP); Hiroki Sato, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 297 days.

This patent is subject to a terminal disclaimer.

(21) Appl. No.: 13/306,902

(22) Filed: Nov. 29, 2011

(65) Prior Publication Data

US 2012/0251400 A1    Oct. 4, 2012

(30) Foreign Application Priority Data

Mar. 29, 2011 (WO) ................ PCT/JP2011/057855

(51) Int. Cl.
*B01D 50/00* (2006.01)

(52) U.S. Cl.
USPC ..................................... 422/180; 422/177

(58) Field of Classification Search
USPC ........ 422/177, 180; 55/523; 428/116; 60/297
See application file for complete search history.

(56) References Cited

U.S. PATENT DOCUMENTS

| | | | |
|---|---|---|---|
| 6,171,557 B1 * | 1/2001 | Takahashi et al. | ............ 422/177 |
| 2006/0263574 A1 | 11/2006 | Tsunekawa et al. | |
| 2006/0292044 A1 | 12/2006 | Ohno et al. | |
| 2009/0143221 A1 | 6/2009 | Ogunwumi et al. | |
| 2009/0214397 A1 * | 8/2009 | Shirono et al. | ................ 422/177 |
| 2009/0291839 A1 | 11/2009 | Kunieda et al. | |

FOREIGN PATENT DOCUMENTS

| | | |
|---|---|---|
| DE | 102010056428 | 6/2011 |
| EP | 1579911 | 9/2005 |
| JP | 7-008754 | 1/1995 |
| JP | 8-310810 | 11/1996 |
| JP | 2011-506237 | 3/2011 |
| WO | WO 2006/040874 | 4/2006 |
| WO | WO 2006/137149 | 12/2006 |
| WO | WO 2009/141874 | 11/2009 |
| WO | WO 2011/144601 | 11/2011 |

OTHER PUBLICATIONS

Extended European Search Report for corresponding EP Application No. 11187264.4-2113, Feb. 28, 2012.

* cited by examiner

*Primary Examiner* — Tom Duong
(74) *Attorney, Agent, or Firm* — Ditthavong Mori & Steiner, P.C.

(57) ABSTRACT

A honeycomb structural body includes at least one honeycomb unit including a β type zeolite, a phosphate group zeolite, and an inorganic binder and having a plurality of through holes divided by partition walls and arranged in a longitudinal direction of the honeycomb unit. The β type zeolite includes secondary particles having an average particle diameter of approximately 0.5 μm or more and approximately 5 μm or less. The phosphate group zeolite includes primary particles having an average particle diameter of approximately 0.5 μm or more and approximately 5 μm or less. A ratio of a mass of the phosphate group zeolite with respect to a total mass of the β type zeolite and the phosphate group zeolite is approximately 5% or more and approximately 35% or less.

36 Claims, 2 Drawing Sheets

HONEYCOMB STRUCTURAL BODY AND EXHAUST GAS CONVERSION APPARATUS

CROSS-REFERENCE TO RELATED APPLICATIONS

The present application claims priority under 35 U.S.C. §119 to International Application No. PCT/JP 2011/057855, filed on Mar. 29, 2011. The contents of this application are incorporated herein by reference in their entirety.

BACKGROUND OF THE INVENTION

1. Field of the Invention

The present invention relates to a honeycomb structural body and an exhaust gas conversion apparatus.

2. Discussion of the Background

Conventionally, as one of the automotive exhaust gas converting systems, an SCR (Selective Catalytic Reduction) system has been known in which NOx is reduced to nitrogen and water by using ammonia.

In the SCR system, zeolite is known as a material for absorbing ammonia.

In WO 06/137149 A1, a honeycomb structural body including a honeycomb unit containing zeolite, inorganic fibers and/or inorganic whiskers, and inorganic binders is disclosed.

The contents of WO 06/137149 A1 are incorporated herein.

SUMMARY OF THE INVENTION

According to one aspect of the present invention, a honeycomb structural body includes at least one honeycomb unit including a β type zeolite, a phosphate group zeolite, and an inorganic binder and having a plurality of through holes divided by partition walls and arranged in a longitudinal direction of the honeycomb unit. The β type zeolite includes secondary particles having an average particle diameter of approximately 0.5 μm or more and approximately 5 μm or less. The phosphate group zeolite includes primary particles having an average particle diameter of approximately 0.5 μm or more and approximately 5 μm or less. A ratio of a mass of the phosphate group zeolite with respect to a total mass of the β type zeolite and the phosphate group zeolite is approximately 5% or more and approximately 35% or less.

According to another aspect of the present invention, an exhaust gas conversion apparatus includes the honeycomb structural body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
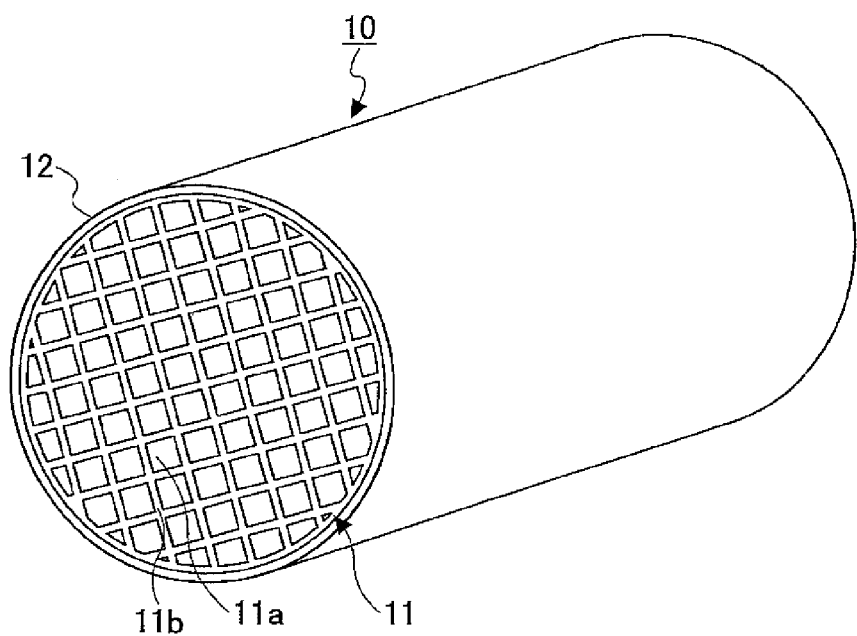
FIG. 1 is a perspective view illustrating an example of a honeycomb structural body according to an embodiment of the present invention.

A NOx conversion efficiency higher than that of the conventional honeycomb structural body of WO 06/137149 A1 is desired. A phosphate group zeolite such as SAPO (silicoaluminophosphate) having a satisfactory NOx conversion efficiency is considered to be used as the material of a honeycomb unit that constitutes a honeycomb structural body.

With an embodiment of the present invention to, it is possible to obtain a honeycomb structural body having satisfactory NOx conversion efficiency and being capable of restraining shrinkage due to absorbing of water in a honeycomb unit and expansion due to desorbing of water in the honeycomb unit, and as a result, the honeycomb unit enables restraining of breakage. Further, with an embodiment of the present invention, it is possible to obtain an exhaust gas conversion apparatus including the honeycomb structural body.

The embodiments will now be described with reference to the accompanying drawings, wherein like reference numerals designate corresponding or identical elements throughout the various drawings.

FIG. 1 illustrates an example of a honeycomb structural body 10 according to an embodiment of the present invention. The honeycomb structural body 10 has a single honeycomb unit 11 including plural through holes 11a partitioned by partition walls 11b and arranged in a longitudinal direction thereof. The honeycomb unit 11 includes a β type zeolite, a phosphate group zeolite, and an inorganic binder. Further, the honeycomb structural body 10 has an outer peripheral coating layer 12 formed on an outer peripheral surface of the honeycomb unit 11 except for both end faces of the honeycomb unit 11.

The β type zeolite includes secondary particles having an average particle diameter of approximately 0.5 to approximately 5 μm. In a case where the average particle diameter of the secondary particles of the β type zeolite is approximately 0.5 μm or more, it becomes easy for exhaust gas to permeate through the inside of a partition wall 11b such that it becomes easy for the β type zeolite and the phosphate group zeolite cannot be effectively used for NOx conversion. On the other hand, in a case where the average particle diameter of the secondary particles of the β type zeolite is approximately 5 μm or less, it becomes difficult for the number of pores of the honeycomb unit 11 to decrease. Accordingly, it becomes easy for exhaust gas to permeate through the inside of the partition wall 11b such that it becomes easy for the β type zeolite and the phosphate group zeolite to be effectively used for NOx conversion.

The average particle diameter of the primary particles included in the β type zeolite is preferably approximately 0.01 to approximately 0.1 μm.

Although the phosphate group zeolite is not limited in particular, the phosphate group zeolite may be a SAPO (e.g., SAPO-5, SAPO-11, SAPO-34 or the like), a MeAPO (metal aluminophosphate), a MeAPSO (metallo-aluminosilicophospate) or the like. Two or more of them may be used together. Among the phosphate group zeolites, it is preferable to use SAPO (more preferably, SAPO-34) for attaining a satisfactory NOx conversion efficiency.

The phosphate group zeolite includes primary particles having an average particle diameter of approximately 0.5 to approximately 5 μm. In a case where the average particle diameter of the primary particles of the phosphate group zeolite is approximately 0.5 μm or more, it becomes easy for exhaust gas to permeate through the inside of a partition wall 11b such that it becomes easy for the β type zeolite and the phosphate group zeolite to be effectively used for NOx conversion. On the other hand, in a case where the average particle diameter of the primary particles of the phosphate group zeolite is approximately 5 μm or less, it becomes difficult for the number of pores of the honeycomb unit 11 to decrease. Accordingly, it becomes easy for exhaust gas to permeate through the inside of the partition wall 11b such that it becomes easy for the β type zeolite and the phosphate group zeolite to be effectively used for NOx conversion.

The ratio of the mass of the phosphate group zeolite with respect to the total mass of the β type zeolite and the phosphate group zeolite is approximately 5 to approximately 35%, and preferably approximately 15 to approximately 25%. In a case where the ratio of the mass of the phosphate group zeolite with respect to the total mass of the β type zeolite and the phosphate group zeolite is approximately 5% or more, it becomes difficult for NOx conversion efficiency to decrease because the amount of β type zeolite and phosphate group zeolite contained in the honeycomb unit is reduced. On the other hand, in a case where the ratio of the mass of the phosphate group zeolite with respect to the total mass of the β type zeolite and the phosphate group zeolite is approximately 35% or less, even in a case of shrinkage due to water being absorbed by the honeycomb unit 11 or expansion due to water being desorbed by the honeycomb unit 11, it becomes difficult for the honeycomb unit 11 to break.

Because the honeycomb unit 11 has the β type zeolite provided at a periphery of the phosphate group zeolite, it becomes easy for shrinkage or expansion due to absorbing or desorbing of water to be prevented from causing the breakage of the honeycomb unit 11. More specifically, although shrinkage and expansion are caused by water being absorbed by the honeycomb unit 11 and water being desorbed by the honeycomb unit 11 cause shrinkage or expansion of the phosphate group zeolite, because of the presence of the β type zeolite, it becomes easy to relieve the shrinkage or expansion of the phosphate group zeolite. Further, because the β type zeolite also has NOx conversion efficiency, it becomes possible for the honeycomb structural body 10 to maintain NOx conversion efficiency even where the honeycomb structural body 10 includes the β type zeolite.

The ratio of the average particle diameter of the primary particles of the phosphate group zeolite with respect to the average particle diameter of the secondary particles of the β type zeolite is preferably approximately 0.25 to approximately 4.0, and more preferably approximately 0.8 to approximately 1.2. In a case where the ratio of the average particle diameter of the primary particles of the phosphate group zeolite with respect to the average particle diameter of the secondary particles of the β type zeolite is approximately 0.25 or more and approximately 4.0 or less, the effect of restraining breakage of the honeycomb unit 11 due to shrinkage when water is absorbed by the honeycomb unit 11 or expansion when water is desorbed by the honeycomb unit 11 is improved.

Considering the NOx conversion efficiency, it is preferable for the β type zeolite to be ion-exchanged with Cu (copper) and/or Fe (iron).

The β type zeolite being ion-exchanged with Cu and/or Fe is preferred to have an ion exchange amount from approximately 1.0 to approximately 5.0 mass %.

It is to be noted that the metal ions used in the ion-exchange of the β type zeolite are not limited to a Cu ions and/or Fe ions. Other transition metal ions enabling improvement of NOx conversion efficiency may be used.

Considering the NOx conversion efficiency, it is preferable for the phosphate group zeolite to be ion-exchanged with Cu and/or Fe.

The phosphate group zeolite being ion-exchanged with Cu and/or Fe is preferred to have an ion exchange amount from approximately 1.0 to approximately 5.0 mass %.

It is to be noted that the metal ions used in the ion-exchange of the phosphate group zeolite are not limited to a Cu ions and/or Fe ions. Other transition metal ions enabling improvement of NOx conversion efficiency may be used.

The honeycomb unit 11 is preferred to have the β type zeolite and the phosphate group zeolite content by weight per apparent volume from approximately 230 to approximately 400 g/L. In a case where the β type zeolite and the phosphate group zeolite content by weight per apparent volume is approximately 230 g/L or more, the apparent volume of the honeycomb unit 11 does not need to be increased in order to improve the NOx conversion efficiency because the amount of β type zeolite and phosphate group zeolite contained in the honeycomb unit 11 is reduced. On the other hand, in a case where the β type zeolite and the phosphate group zeolite content by weight per apparent volume is approximately 400 g/L or less, it becomes difficult for the strength of the honeycomb unit 11 to become insufficient and it becomes difficult for the aperture ratio of the honeycomb unit 11 to decrease.

A solid of, for example, alumina sol, silica sol, titania sol, soluble glass, sepiolite, attapulgite, boehmite or the like may be the inorganic binder(s) included in the honeycomb unit 11. Two or more kinds of inorganic binders may be used.

The content as solid content of the inorganic binder of the honeycomb unit 11 is preferably approximately 5 to approximately 30 mass %, and more preferably approximately 10 to approximately 20 mass %. In a case where the content as solid content of the inorganic binder is approximately 5 mass % or more, it becomes difficult for the strength of the honeycomb unit 11 to decrease. On the other hand, in a case where the content as solid content of the inorganic binder is approximately 30 mass % or less, it becomes less difficult to perform extrusion molding of the honeycomb unit 11.

In order to increase the strength of the honeycomb unit 11, it is preferable for the honeycomb unit 11 to further include one or more materials selected from a group of an inorganic fiber, a scale-like material, a tetrapod-shaped material, or a three-dimensional needle-shaped material.

Although the inorganic fiber included in the honeycomb unit 11 is not limited in particular, the inorganic fiber may be alumina fibers, silica fibers, silicon carbide fibers, silica alumina fibers, glass fibers, potassium titanate fibers, aluminum borate fibers or the like. Two or more kinds of inorganic fibers may be used.

The aspect ratio of the inorganic fibers is preferably approximately 2 to approximately 1000, more preferably, approximately 5 to approximately 800, and still more preferably, approximately 10 to approximately 500. In a case where the aspect ratio of the inorganic fibers is approximately 2 or more, it becomes difficult for the effect of increasing the strength of the honeycomb unit 11 to be reduced. On the other hand, in a case where the aspect ratio of the inorganic fibers is approximately 1000 or less, it becomes difficult for clogging or the like, for example, to occur in the molding die when performing extrusion molding for forming the honeycomb unit 11. Further, it becomes difficult for breakage of the inorganic fibers to occur, such that it becomes difficult for the effect of increasing the strength of the honeycomb unit 11 to be reduced.

The scale-like material refers to a planar material. It is preferable for the scale-like material to have a thickness of approximately 0.2 µm to approximately 5 µm and a maximum length of approximately 10 µm to approximately 160 µm. The ratio of the maximum length of the scale-like material with respect to the thickness of the scale-like material is preferably approximately 3 to approximately 250.

Although the scale-like material included in the honeycomb unit 11 is not limited in particular, the scale-like material included in the honeycomb unit 11 may be glass, muscovite, alumina, silica or the like. Two or more kinds of the scale-like material may be used.

The tetrapod-shaped material refers to a material having a needle-like part extending three-dimensionally. The average length of the needles of the needle-like part is preferably approximately 5 µm to approximately 30 µm. The average diameter of the needles of the needle-like part is preferably approximately 0.5 µm to approximately 5 µm.

Although the material of the tetrapod-shaped material included in the honeycomb unit 11 is not limited in particular, the material of the tetrapod-shaped material may be zinc oxide or the like. Two or more kinds of the tetrapod-shaped material may be used.

The three-dimensional needle-like material refers to a material including needle-like parts combined to each other by an inorganic compound (e.g., glass) at a center area of the needle-like parts. The average length of the needles of the needle-like parts is preferably approximately 5 µm to approximately 30 µm. The average diameter of the needles of the needle-like parts is preferably approximately 0.5 µm to approximately 5 µm.

Further, the needle-like parts may be connected three-dimensionally. The diameter of the needle-like parts is preferably approximately 0.1 µm to approximately 5 µm, the length of the needle-like parts is preferably approximately 0.3 µm to approximately 30 µm, and the ratio of the length of the needle-like parts to the diameter of the needle-like parts is preferably approximately 1.4 to approximately 50.0.

Although the three-dimensional needle-like material included in the honeycomb unit 11 is not limited in particular, the three-dimensional needle-like material may be alumina, silica, silicon carbide, silica alumina, glass, potassium titanate, aluminum borate, boehmite or the like. Two or more kinds of the three-dimensional needle-like material may be used.

The content of one or more kinds selected from a group of the inorganic fiber, the scale-like material, the tetrapod-shaped material, and the three-dimensional needle-like material in the honeycomb unit 11 is preferably approximately 3 mass % to approximately 50 mass %, more preferably, approximately 3 mass % to approximately 30 mass %, and still more preferably, approximately 5 mass % to approximately 20 mass %. In a case where the content of one or more kinds selected from a group of the inorganic fiber, the scale-like material, the tetrapod-shaped material, and the three-dimensional needle-like material in the honeycomb unit 11 is approximately 3 mass % or more, it becomes difficult for the effect of increasing the strength of the honeycomb unit 11 to be reduced. On the other hand, in a case where the content of one or more kinds selected from a group of the inorganic fiber, the scale-like material, the tetrapod-shaped material, and the three-dimensional needle-like material in the honeycomb unit 11 is approximately 50 mass % or less, it becomes difficult for the content of the β type zeolite and the phosphate group zeolite in the honeycomb unit 11 to decrease so that it becomes difficult for the NOx conversion efficiency to be reduced.

The porosity of the honeycomb unit 11 is preferably approximately 20% to approximately 50%. In a case where the porosity of the honeycomb unit 11 is approximately 20% or more, it becomes easy for exhaust gas to permeate into the partition walls 11b. Thus, it becomes easy for the β type zeolite and the phosphate group zeolite to be effectively used for NOx conversion. On the other hand, in a case where the porosity of the honeycomb unit 11 is approximately 50% or less, it becomes difficult for the strength of the honeycomb unit 11 to become insufficient.

It is to be noted that the porosity of the honeycomb unit 11 can be measured by using a mercury penetration method.

The aperture ratio of a cross section of the honeycomb unit 11 perpendicular to the longitudinal direction of the honeycomb unit 11 is preferably approximately 50% to approximately 75%. In a case where the aperture ratio of the cross section perpendicular to the longitudinal direction of the honeycomb unit 11 is approximately 50% or more, it becomes easy for the β type zeolite and the phosphate group zeolite to be effectively used for NOx. On the other hand, in a case where the aperture ratio of the cross section perpendicular to the longitudinal direction of the honeycomb unit 11 is approximately 75%, it becomes difficult for the strength of the honeycomb unit 11 to become insufficient.

The density of the through-holes 11a of the cross section perpendicular to the longitudinal direction of the honeycomb unit 11 is preferably approximately 31 units per $cm^2$ to approximately 155 units per $cm^2$. In a case where the density of the through-holes 11a of the cross section perpendicular to the longitudinal direction of the honeycomb unit 11 is approximately 31 units per $cm^2$ or more, it becomes easy for exhaust gas and the β type zeolite and the phosphate group zeolite to make contact. Thus, it becomes difficult for the NOx conversion efficiency to be reduced. On the other hand, in a case where the density of the through-holes 11a of the cross section perpendicular to the longitudinal direction of the honeycomb unit 11 is approximately 155 units per $cm^2$ or less, it becomes difficult for the pressure loss of the honeycomb structural body 10 to increase.

The thickness of the partition wall 11b of the honeycomb unit 11 is preferably approximately 0.1 mm to approximately 0.4 mm, and more preferably approximately 0.1 mm to approximately 0.3 mm. In a case where the thickness of the partition wall 11b is approximately 0.1 mm or more, it becomes difficult for the strength of the honeycomb unit 11 to decrease. On the other hand, in a case where the thickness of the partition wall 11b is approximately 0.4 mm or less, it becomes easy for exhaust gas to permeate into the partition wall 11b. Thus, it becomes easy for the β type zeolite and the phosphate group zeolite to be effectively used for NOx conversion.

The thickness of the outer peripheral coating layer 12 is preferably approximately 0.1 mm to approximately 2.0 mm. In a case where the thickness of the outer peripheral coating layer 12 is approximately 0.1 mm or more, it becomes difficult for the effect of increasing the strength of the honeycomb structural body 10 to become insufficient. On the other hand, in a case where the thickness of the outer peripheral coating layer 12 is approximately 2.0 mm or less, it becomes difficult for the content of the β type zeolite and the phosphate group zeolite per volume unit of the honeycomb structural body 10 to be reduced. Thus, it becomes difficult for the NOx conversion efficiency to be reduced.

Although the shape of the honeycomb structure 10 is substantially cylindrical, the shape of the honeycomb structure 10 is not limited in particular. The shape of the honeycomb structure 10 may be a substantially rectangular pillar, a substantially elliptical pillar, a substantially oval pillar, a substantially round chamfered pillar (e.g., substantially round chamfered triangular pillar) or the like.

The shape of the through-holes 11a is not limited to a substantially square pillar. The shape of the through-holes may be a substantially triangular pillar, a substantially hexagonal pillar or the like.

Next, an example of a method for manufacturing the honeycomb structural body 10 according to an embodiment of the present invention is described. First, a raw substantially cylindrical honeycomb molded body, in which plural through-holes separated by walls are formed in parallel in a longitudinal direction, is manufactured by performing extrusion molding using a raw material paste containing a β type zeolite, a phosphate group zeolite, and an inorganic binder (and according to necessity, one or more kinds selected from a group of the inorganic fiber, the scale-like material, the tetrapod-shaped material, and the three-dimensional needle-like material).

Although the inorganic binder contained in the raw material paste is not limited in particular, the inorganic binder is added as alumina sol, silica sol, titania sol, soluble glass, sepiolite, attapulgite, boehmite and the like. Two or more kinds of inorganic binders may be used.

Further, an organic binder, a dispersion medium, a molding aid, and the like may be arbitrarily added to the raw material paste, if necessary.

Although the organic binder is not limited in particular, the organic binder may be methylcellulose, carboxymethyl cellulose, hydroxylethyl cellulose, polyethyleneglycol, phenol resin, epoxy resin or the like. Two or more kinds of organic binders may be used. The adding amount of the organic binder is preferably approximately 1 mass % to approximately 10 mass % of the total mass of the one or more kinds selected from a group of the β type zeolite, the phosphate group zeolite, the inorganic binder, the inorganic fiber, the scale-like material, the scale-like particles, the tetrapod-shaped material, and the three-dimensional needle-like material.

Although the dispersion medium is not limited in particular, the dispersion medium may be water, an organic solvent such as benzene, alcohol such as methanol, and the like. Two or more kinds of dispersion media may be used.

Although the molding aid is not limited in particular, the molding aid may be ethylene glycol, dextrin, fatty acid, fatty acid soap, polyalcohol or the like. Two or more kinds of molding aids may be used.

When preparing the raw material paste, it is preferable for the raw material paste to be mixed and kneaded. The raw material paste can be mixed by using a mixer, an attritor or the like, and can be kneaded by a kneader or the like.

Then, the raw honeycomb molded body is dried by using a drying apparatus such as a microwave drying apparatus, a hot air drying apparatus, a dielectric drying apparatus, a reduced pressure drying apparatus, a vacuum drying apparatus, and a freeze drying apparatus. Thereby, a dried honeycomb body is manufactured.

Further, the dried honeycomb body is degreased. The degreasing conditions can be arbitrarily selected depending on the amount and kind of organic substances contained in the dried honeycomb body. However, the dried honeycomb body is preferably degreased at approximately 400° C. for approximately 2 hours.

Then, by firing the degreased honeycomb body, the honeycomb unit 11 having a substantially cylindrical shape is manufactured. The firing temperature is preferably approximately 600° C. to approximately 1200° C., and more preferably approximately 600° C. to approximately 1000° C. In a case where the firing temperature is approximately 600° C. or more, it becomes easy for the sintering to progress, such that it becomes difficult for the strength of the honeycomb unit 11 to decrease. On the other hand, in a case where the firing temperature is approximately 1200° C. or less, the sintering does not excessively progress such that it becomes difficult for the reactive sites of the β type zeolite and the phosphate group zeolite to decrease.

Then, an outer peripheral coating layer paste is applied onto an outer peripheral surface of the substantially cylindrical honeycomb unit 11.

The outer peripheral coating layer paste is not limited in particular. The outer peripheral coating layer paste may be a mixture of an inorganic binder and inorganic particles, a mixture of the inorganic binder and inorganic fibers, a mixture of the inorganic binder, the inorganic particles, and the inorganic fibers or the like.

Although the inorganic binder included in the outer peripheral coating layer paste is not limited in particular, the inorganic binder is added as silica sol, alumina sol, or the like. Two or more kinds of inorganic binders may be used. Among the inorganic binders, it is preferable to add silica sol.

Although the material constituting the inorganic particles of the outer peripheral coating layer paste is not limited in particular, the material may be, for example, a carbide (e.g., silicon carbide), a nitride (e.g., silicon nitride, boron nitride) or the like. Two or more kinds of the inorganic particles may be used. Among the inorganic particles, silicon carbide is preferable because silicon carbide has satisfactory thermal conductivity.

Although the material constituting the inorganic fibers of the outer peripheral coating layer paste is not limited in particular, the inorganic fibers may be silica alumina fibers, mullite fibers, alumina fibers, silica fibers or the like. Two or more kinds of the inorganic fibers may be used. Among the inorganic fibers, alumina fibers are preferable.

The outer peripheral coating layer paste may further include an organic binder.

Although the organic binder included in the outer peripheral coating layer paste is not limited in particular, the organic binder may be polyvinyl alcohol, methylcellulose, ethylcellulose, carboxymethylcellulose or the like. Two or more kinds of the organic binders may be used.

The outer peripheral coating layer paste may further include, for example, balloons (i.e. minute hollow balls of oxide-based ceramic), a pore-forming agent or the like.

Although the balloon included in the outer peripheral coating layer paste is not limited in particular, the balloon may be an alumina balloon, a glass micro balloon, a shirasu-balloon, a fly ash balloon, a mullite balloon or the like. Two or more kinds of the balloons may be used. Among the balloons, alumina balloons are preferable.

Although the pore-forming agent included in the outer peripheral coating layer paste is not limited in particular, the pore-forming agent may be spherical acryl particles, graphite or the like. Two or more kinds of the pore-forming agents may be used.

Then, the honeycomb unit 11 being coated with the outer peripheral coating layer paste is solidified by drying. Thereby, a substantially cylindrical shaped honeycomb structural body 10 is manufactured. In a case where the outer peripheral coating layer paste of the honeycomb structural body 10 contains an organic binder, a degreasing process is preferably performed on the honeycomb structural body 10. The degreasing conditions can be arbitrarily selected depending on the amount and kind of organic substances. However, the degreasing conditions are preferably at approximately 700° C. for approximately 20 minutes.

It is to be noted that the β type zeolite and the phosphate group zeolite may be ion exchanged by having the honeycomb unit 11 steeped into a solution containing Cu (copper) ions and/or Fe (iron) ions. Further, a raw material paste containing at least one of the β type zeolite and the phosphate group zeolite being ion exchanged by copper ions and/or iron ions may be used as the raw material paste.

Figure 2:
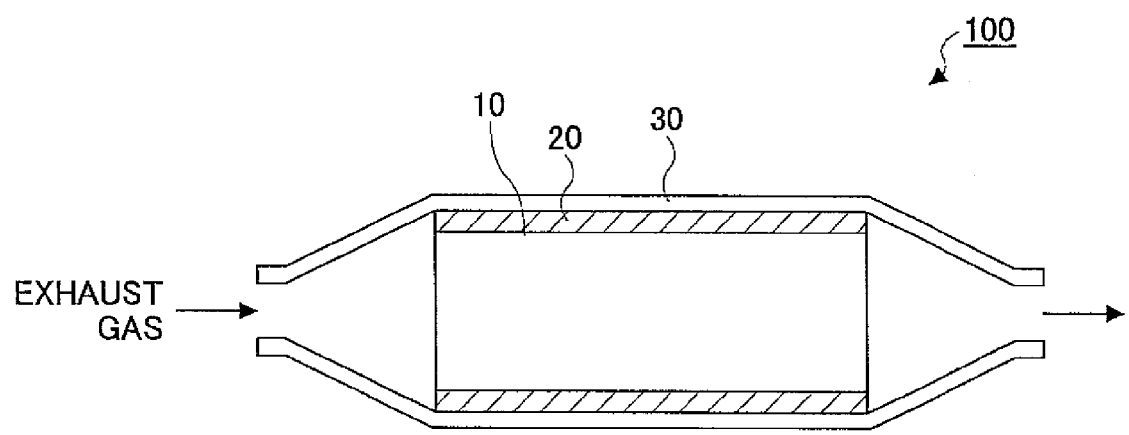
FIG. 2 is a cross-sectional view illustrating an example of an exhaust gas conversion apparatus according to an embodiment of the present invention.

FIG. 2 illustrates an example of an exhaust gas conversion apparatus 100 according to an embodiment of the present invention. The exhaust gas conversion apparatus 100 can be manufactured by installing (e.g., canning) the honeycomb structural body 10 in a metal container 30 in a state where a holding sealing member 20 is provided at an outer peripheral part of the honeycomb structural body 10. Further, the exhaust gas conversion apparatus 100 has an ammonia supply part (not illustrated) inside a pipe (not illustrated) provided on an upstream side of the honeycomb structural body 10 with respect to the direction in which exhaust gas flows. By supplying ammonia into the pipe with the ammonia supply part, the ammonia is added to the exhaust gas flowing in the pipe. Thereby, the β type zeolite and the phosphate group zeolite included in the honeycomb unit 11 of the honeycomb structural body 10 reduces NOx contained in the exhaust gas.

The compound that generates ammonia by being decomposed is not limited in particular as long as the compound can generate ammonia by being heated with exhaust gas inside the pipe. However, it is preferable for the compound to be urea water because urea water has satisfactory storage stability.

Thus, urea water generates ammonia by being heated with exhaust gas and being hydrolyzed inside the pipe.

Figure 3:
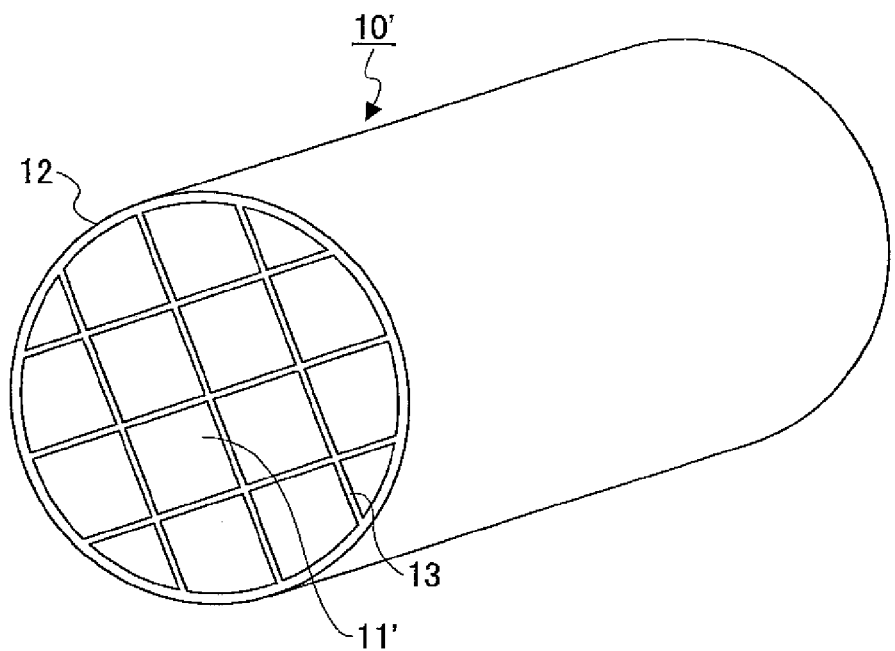
FIG. 3 is a perspective view illustrating other example of a honeycomb structural body according to an embodiment of the present invention.
Figure 4:
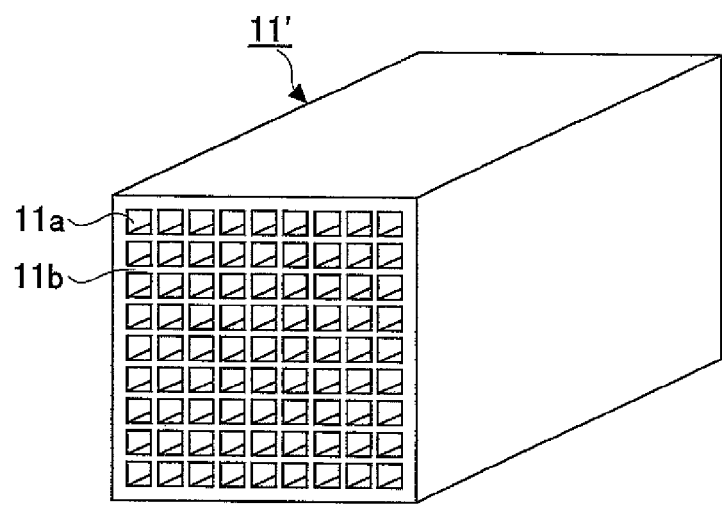
FIG. 4 is a perspective view illustrating a honeycomb unit constituting the honeycomb structural body of FIG. 3.

A honeycomb structural body 10' is illustrated as other example of the honeycomb structural body according to an embodiment of the present invention in FIG. 3. The honeycomb structural body 10' has substantially the same configuration as the configuration of the honeycomb structural body 10 except that the honeycomb structural body 10' has plural honeycomb units 11' adhered thereto by interposing an adhesive layer 13. Each of the plural honeycomb units 11' includes plural through-holes 11a divided by partition walls 11b and arranged in a longitudinal direction thereof (see FIG. 4).

The cross section of the honeycomb unit 11' perpendicular to the longitudinal direction of the honeycomb unit 11' preferably has an area of approximately 10 cm$^2$ to approximately 200 cm$^2$. In a case where the area of the cross section of the honeycomb unit 11' perpendicular to the longitudinal direction of the honeycomb unit 11' is approximately 10 cm$^2$ or more, it becomes difficult for the pressure loss of the honeycomb structural body 10' to increase. On the other hand, in a case where the area of the cross section of the honeycomb unit 11' perpendicular to the longitudinal direction of the honeycomb unit 11' is approximately 200 cm$^2$ or less, it becomes difficult for the strength against thermal stress of the honeycomb unit 11' to become insufficient.

Other than the cross section of the honeycomb unit 11' perpendicular to the longitudinal direction of the honeycomb unit 11', the honeycomb unit 11' is substantially the same as the honeycomb unit 11.

The thickness of the adhesive layer 13 is preferably approximately 0.5 mm to approximately 2.0 mm. In a case where the thickness of the adhesive layer 13 is approximately 0.5 mm or more, it becomes difficult for the adhesive strength among the honeycomb units 11' to become insufficient. On the other hand, in a case where the thickness of the adhesive layer 13 is approximately 2.0 mm or less, it becomes difficult for the pressure loss of the honeycomb structural body 10' to increase.

Next, an example of a method for manufacturing the honeycomb structural body 10' according to an embodiment of the present invention is described. First, substantially in the same manner as the honeycomb structural body 10, honeycomb units 11' having substantially square pillar shapes are formed. Then, an adhesive layer paste is applied to the outer peripheral surface of the honeycomb units 11' except for both end faces of the honeycomb units 11'. Then, the honeycomb units 11' are sequentially adhered together and solidified by drying. Thereby, an aggregate of the honeycomb units 11' can be manufactured.

The adhesive layer paste is not limited in particular. The adhesive layer paste may be a mixture of an inorganic binder and inorganic particles, a mixture of the inorganic binder and inorganic fibers, a mixture of the inorganic binder, the inorganic particles, and the inorganic fibers or the like.

Although the inorganic binder included in the adhesive layer paste is not limited in particular, the inorganic binder is added as silica sol, alumina sol, or the like. Two or more kinds of inorganic binders may be used. Among the inorganic binders, it is preferable to add silica sol.

Although the material constituting the inorganic particles of the adhesive layer paste is not limited in particular, the material may be, for example, a carbide (e.g., silicon carbide), a nitride (e.g., silicon nitride, boron nitride) or the like. Two or more kinds of the inorganic particles may be used. Among the inorganic particles, silicon carbide is preferable because silicon carbide has satisfactory thermal conductivity.

Although the material constituting the inorganic fibers of the adhesive layer paste is not limited in particular, the inorganic fibers may be silica alumina fibers, mullite fibers, alumina fibers, silica fibers or the like. Two or more kinds of the inorganic fibers may be used. Among the inorganic fibers, alumina fibers are preferable.

The adhesive layer paste may further include an organic binder.

Although the organic binder included in the adhesive layer paste is not limited in particular, the organic binder may be polyvinyl alcohol, methylcellulose, ethylcellulose, carboxymethylcellulose or the like. Two or more kinds of the organic binders may be used.

The adhesive layer paste may further include, for example, balloons (i.e. minute hollow balls of oxide-based ceramic), a pore-forming agent or the like.

Although the balloon included in the adhesive layer paste is not limited in particular, the balloon may be an alumina balloon, a glass micro balloon, a shirasu-balloon, a fly ash balloon, a mullite balloon or the like. Two or more kinds of the balloons may be used. Among the balloons, alumina balloons are preferable.

Although the pore-forming agent included in the adhesive layer paste is not limited in particular, the pore-forming agent may be spherical acryl particles, graphite or the like. Two or more kinds of the pore-forming agents may be used.

Then, by cutting the aggregate of honeycomb units 11' into a substantially cylindrical shape (and polishing the aggregate of honeycomb units 11' according to necessity), a substantially cylindrical-shaped aggregate of honeycomb units 11' can be manufactured.

Alternatively, instead of cutting the aggregate of honeycomb units 11' into a substantially cylindrical shape, the substantially cylindrical shaped aggregate of honeycomb units 11' may be obtained by adhering together honeycomb units 11' each of which having a cross-section perpendicular to the longitudinal direction of the honeycomb unit 11' that is molded into a predetermined shape. In this case, the predetermined shape of the cross-section perpendicular to the longitudinal direction of the honeycomb unit 11' is preferred to be a substantially fan-shape having a central angle of approximately 90°.

Then, an outer peripheral coating layer paste is applied to the outer peripheral surface of the substantially cylindrical-shaped aggregate of honeycomb units 11'.

The outer peripheral coating layer paste may be, for example, substantially the same as or different from the material of the adhesive layer paste.

Then, the aggregate of the honeycomb units 11' being coated with the outer peripheral coating layer paste is solidified by drying. Thereby, a substantially cylindrical shaped honeycomb structural body 10' is manufactured. In a case where the adhesive layer paste and/or the outer peripheral coating layer paste of the honeycomb structural body 10' contains an organic binder, a degreasing process is preferably performed on the honeycomb structural body 10'. The degreasing conditions can be arbitrarily selected depending on the amount and kind of organic substances. However, the degreasing conditions are preferably at approximately 700° C. for approximately 20 minutes.

It is to be noted that the honeycomb structural bodies 10 and 10' may be formed without the outer peripheral coating layer 12.

EXAMPLES

In the following examples, "parts" refers to "parts by mass".

Example 1

A raw material paste 1 was prepared by mixing and kneading: β type zeolite (2400 parts) including secondary particles having an average particle diameter of 3 μm; SAPO-34 (600 parts) including primary particles having an average particle diameter of 3 μm as phosphate group zeolite; boehmite (840 parts); alumina fiber (650 parts) having an average fiber diameter of 6 μm and an average fiber length of 100 μm; methylcellulose (330 parts); oleic acid (330 parts); and ion exchanged water (1800 parts).

Then, extrusion molding was performed on the raw material paste 1 by using an extruder. Thereby, a quadrate pillar-shape honeycomb molded body was manufactured. Then, the honeycomb molded body was dried for 10 minutes at 110° C. by using a microwave drying apparatus and a hot air drying apparatus. Then, the dried honeycomb body was degreased at 400° C. for 5 hours. Then, the degreased honeycomb body was fired at 700° C. for 2 hours. Thereby, a fired honeycomb body was manufactured. Then, the β type zeolite and the SAPO-34 of the fired honeycomb body was ion exchanged with copper ions by steeping the fired honeycomb body into a copper nitrate solution. Thereby, the honeycomb unit 11' was manufactured. In measuring the exchange amount of copper ions of β type zeolite and SAPO-34 by performing ICP (Inductively Coupled Plasma) analysis with an ICPS-8100 (manufactured by Shimadzu Corp.), 2.7 mass % was measured. The honeycomb structural body 10 has a quadrate pillar-shape whose single side is 38 mm and length is 15. In the honeycomb unit 11', the thickness of the partition walls was 0.28 mm and the density of the through holes was 62 units/cm².

Then, an adhesive layer paste was prepared by mixing and kneading: alumina fiber (767 parts) having an average fiber diameter of 0.5 μm and an average fiber length of 15 μm; silica glass (2500 parts); carboxyl methylcellulose (17 parts); silica sol (600 parts) of 30 mass % as solid content; polyvinyl alcohol (167 parts); and alumina balloon (17 parts).

Then, 16 honeycomb units 11' were adhered together by applying the adhesive layer paste to the outer peripheral surface of the honeycomb units 11' except for the outer peripheral surface of both end parts of the honeycomb units 11'. The adhesive layer paste was applied so that the thickness of the adhesive layer is 2.0 mm. The adhesive layer paste was solidified by drying at a temperature of 150° C. for 10 minutes. Then, an aggregate of the honeycomb units 11' was manufactured by cutting the honeycomb units 11' into a cylindrical shape with a diamond cutter so that the cross section perpendicular to the longitudinal direction of the honeycomb units becomes substantially point symmetrical.

Then, an adhesive layer paste was applied to the outer peripheral surface of the aggregate of the honeycomb units 11' except for the outer peripheral surface of both end parts of the aggregate of honeycomb units 11'. The adhesive layer paste was applied so that the thickness of the coat layer is 1.0 mm. The adhesive layer paste was solidified by drying the adhesive layer paste for 10 minutes at 150° C. by using a microwave drying apparatus and a hot air drying apparatus. Then, the dried honeycomb body was degreased at 400° C. for 2 hours. Then, the degreased honeycomb body was fired at 400° C. for 2 hours. Thereby, a honeycomb structural body 10' having a cylindrical shape with a diameter of 160 mm and a length of 150 mm was manufactured.

Example 2

The honeycomb structural body 10' was manufactured under the same conditions as those of Example 1 except for changing the amount of adding the β type zeolite and the SAPO-34 to 2700 parts and 300 parts, respectively.

Example 3

The honeycomb structural body 10' was manufactured under the same conditions as those of Example 1 except for changing the amount of adding the β type zeolite and the SAPO-34 to 2100 parts and 900 parts, respectively.

Example 4

The honeycomb structural body 10' was manufactured under the same conditions as those of Example 1 except for changing the amount of adding the β type zeolite and the SAPO-34 to 2850 parts and 150 parts, respectively.

Example 5

The honeycomb structural body 10' was manufactured under the same conditions as those of Example 1 except for changing the amount of adding the β type zeolite and the SAPO-34 to 1950 parts and 1050 parts, respectively.

Example 6

The honeycomb structural body 10' was manufactured under the same conditions as those of Example 1 except for using β type zeolite including secondary particles having an average particle diameter of 0.5 μm and SAPO-34 including primary particles having an average particle diameter of 2 μm instead of using β type zeolite including secondary particles having an average particle diameter of 3 μm and SAPO-34 including primary particles having an average particle diameter of 3 μm, respectively.

Example 7

The honeycomb structural body 10' was manufactured under the same conditions as those of Example 1 except for using β type zeolite including secondary particles having an average particle diameter of 1 μm and SAPO-34 including primary particles having an average particle diameter of 4 μm instead of using β type zeolite including secondary particles having an average particle diameter of 3 μm and SAPO-34 including primary particles having an average particle diameter of 3 μm, respectively.

Comparative Example 1

A honeycomb structural body was manufactured under the same conditions as those of Example 1 except for changing the amount of adding the β type zeolite and the SAPO-34 to 3000 parts and 0 parts, respectively.

Comparative Example 2

A honeycomb structural body was manufactured under the same conditions as those of Example 1 except for changing the amount of adding the β type zeolite and the SAPO-34 to 1500 parts and 1500 parts, respectively.

[Crack Evaluation]

A process of absorbing water of 20 mass % and a process of desorbing absorbed water at a temperature of 100° C. were repetitively performed 5 times on the honeycomb units of Examples 1 to 7 and Comparative Examples 1 and 2. Then, generation of cracks in the honeycomb units of Examples 1 to 7 and Comparative Examples 1 and 2 was evaluation based on visual observation. In the following [Table 1], "○" indicates a case where it is evaluated that no crack is formed in a honeycomb unit and "X" indicates a case where it is evaluated that a crack is formed in a honeycomb unit. No cracks were formed in Examples 1 to 7 and Comparative Example 1 whereas cracks were formed in Comparative Example 2.

[Evaluation of NOx Conversion Efficiency]

Samples for evaluation are manufactured by cutting out a part of the quadrate pillar shaped honeycomb unit whose single side is 30 mm and length is 40 mm of the honeycomb structural body manufactured in Examples 1 to 7 and Comparative examples 1 and 2.

In a state where an imitation gas of 200° C. is allowed to flow into each of the samples at a space velocity (SV) of 35000/hr, a catalyst evaluation apparatus SIGU (manufactured by Horiba Ltd.) was used to measure the outflow of NOx flowing out from the samples and to measure the NOx conversion efficiency [%] expressed with a formula "(inflow of NOx−outflow of NOx)/(outflow of NOx)×100". The composition of the imitation gas is nitric oxide (175 ppm), nitrogen dioxide (175 ppm), ammonia (350 ppm), oxygen (14 volume %), water (10 volume %), and nitrogen (balance). The NOx conversion efficiency of Examples 1 to 7 and Comparative Examples 1 and 2 was 77%, 74%, 80%, 71%, 82%, 78%, 75%, 65%, and 85%, respectively. The results of evaluating cracks in the honeycomb unit and NOx conversion efficiency of the samples are shown in [Table 1].

[Determination of Average Particle Diameter]

The secondary particles included in the β type zeolite and the primary particles included in the phosphate group zeolite may be spherical or not. In a case where these primary (secondary) particles are not spherical, the longest length of the figure of the primary (secondary) particles is the diameter of the primary (secondary) particles wherein the outer periphery (outer peripheries) of the primary (secondary) particles is assumed as a single figure.

TABLE 1

| | AVERAGE PARTICLE DIAMETER [μm] | | MASS RATIO | | | CONVERSION |
|---|---|---|---|---|---|---|
| | β TYPE ZEOLITE (SECONDARY PARTICLE) | SAPO-34 (PRIMARY PARTICLE) | SAPO-34 | β TYPE ZEOLITE | CRACK | RATE OF NOx [%] |
| EXAMPLE 1 | 3 | 3 | 20 | 80 | ○ | 77 |
| EXAMPLE 2 | 3 | 3 | 10 | 90 | ○ | 74 |
| EXAMPLE 3 | 3 | 3 | 30 | 70 | ○ | 80 |
| EXAMPLE 4 | 3 | 3 | 5 | 95 | ○ | 71 |
| EXAMPLE 5 | 3 | 3 | 35 | 65 | ○ | 82 |
| EXAMPLE 6 | 0.5 | 2 | 20 | 80 | ○ | 78 |
| EXAMPLE 7 | 1 | 4 | 20 | 80 | ○ | 75 |
| COMPARATIVE EXAMPLE 1 | 3 | 3 | 0 | 100 | ○ | 65 |
| COMPARATIVE EXAMPLE 2 | 3 | 3 | 50 | 50 | x | 85 |

According to Table 1, it can be understood that no cracks are formed even in a case where water was absorbed by the honeycomb unit 11' of Examples 1 to 7 or absorbed water was desorbed by the honeycomb unit 11' of Examples 1 to 7. Further, the samples cut out from the honeycomb unit 11' of Examples 1 to 7, have a NOx conversion efficiency of 71 to 82%.

On the other hand, although no cracks are formed in a case where water was absorbed by the honeycomb unit of Comparative Example 1 or absorbed water was desorbed by the honeycomb unit of Comparative Example 1, NOx conversion efficiency of the sample cut out from the honeycomb unit of the Comparative Example 1 decreased to 65%. It is considered that the NOx conversion efficiency decreased because the ratio of the mass of SAPO-34 with respect to the total mass of β type zeolite and SAPO-34 included in the honeycomb unit is low.

Further, although the sample cut out from the honeycomb unit of the Comparative Example 2 has an NOx conversion rate of 85%, cracks were formed in a case where water was absorbed by the honeycomb unit of Comparative Example 2 or absorbed water was desorbed by the honeycomb unit of Comparative Example 2. It is considered that shrinkage or expansion of the honeycomb unit occurred and caused the forming of cracks because the ratio of the mass of SAPO-34 with respect to the total mass of β type zeolite and SAPO-34 included in the honeycomb unit is high.

As a result, it is considered that cracks were formed in Comparative Example 2.

Obviously, numerous modifications and variations of the present invention are possible in light of the above teachings. It is therefore to be understood that within the scope of the appended claims, the invention may be practiced otherwise than as specifically described herein.

The invention claimed is:

1. A honeycomb structural body comprising:
at least one honeycomb unit including a β type zeolite, a phosphate group zeolite, and an inorganic binder and having a plurality of through holes divided by partition walls and arranged in a longitudinal direction of the honeycomb unit;
wherein the β type zeolite includes secondary particles having an average particle diameter of approximately 0.5 μm or more and approximately 5 μm or less,
wherein the phosphate group zeolite includes primary particles having an average particle diameter of approximately 0.5 μm or more and approximately 5 μm or less,
wherein a ratio of a mass of the phosphate group zeolite with respect to a total mass of the β type zeolite and the phosphate group zeolite is approximately 5% or more and approximately 35% or less.

2. The honeycomb structural body as claimed in claim 1, wherein a ratio of the average particle diameter of the primary particles of the phosphate group zeolite with respect to the average particle diameter of the secondary particles of the β type zeolite is approximately 0.25 or more and approximately 4.0 or less.

3. The honeycomb structural body as claimed in claim 2, wherein a ratio of the average particle diameter of the primary particles of the phosphate group zeolite with respect to the average particle diameter of the secondary particles of the β type zeolite is approximately 0.8 to approximately 1.2.

4. The honeycomb structural body as claimed in claim 1, wherein the phosphate group zeolite is SAPO (silico-aluminophosphate).

5. The honeycomb structural body as claimed in claim 4, wherein the SAPO is SAPO-34.

6. The honeycomb structural body as claimed in claim 1, wherein at least one of the β type zeolite and the phosphate group zeolite is obtained by ion-exchange with a copper ion, an iron ion or a combination of a copper ion and an iron ion.

7. The honeycomb structural body as claimed in claim 1, wherein the inorganic binder includes a solid containing alumina sol, silica sol, titania sol, soluble glass, sepiolite, attapulgite, boehmite or a mixture thereof.

8. The honeycomb structural body as claimed in claim 1, wherein the honeycomb unit includes an inorganic fiber, a scale-like material, a tetrapod-shaped material, a three-dimensional needle-shaped material or a combination thereof.

9. The honeycomb structural body as claimed in claim 8, wherein
the inorganic fiber includes alumina fiber, silica fiber, silicon carbide fiber, silica alumina fiber, glass fiber, potassium titanate fiber, aluminum borate fiber or a combination thereof,
the scale-like material includes glass, muscovite, alumina, silica or a combination thereof,
the tetrapod-shaped material includes zinc oxide, and
the three-dimensional needle-shaped material includes alumina, silica, silicon carbide, silica alumina, glass, potassium titanate, aluminum borate, boehmite or a mixture thereof.

10. The honeycomb structural body as claimed in claim 1, wherein the honeycomb structural body includes a plurality of the honeycomb units.

11. The honeycomb structural body as claimed in claim 10, wherein each of the plural honeycomb units has a cross-section perpendicular to the longitudinal direction of the honeycomb unit that is substantially a fan-shape having a central angle of approximately 90°.

12. The honeycomb structural body as claimed in claim 1, wherein the honeycomb structural body has a single honeycomb unit.

13. The honeycomb structural body as claimed in claim 1, wherein the average particle diameter of the primary particles included in the β type zeolite is approximately 0.01 μm to approximately 0.1 μm.

14. The honeycomb structural body as claimed in claim 1, wherein the phosphate group zeolite is a SAPO, a MeAPO (metal aluminophosphate), or a MeAPSO (metallo-aluminosilicophospate).

15. The honeycomb structural body as claimed in claim 14, wherein the SAPO is SAPO-5, SAPO-11, or SAPO-34.

16. The honeycomb structural body as claimed in claim 1, wherein a ratio of a mass of the phosphate group zeolite with respect to a total mass of the β type zeolite and the phosphate group zeolite is approximately 15% to approximately 25%.

17. An exhaust gas conversion apparatus comprising:
the honeycomb structural body claimed in claim 1.

18. The exhaust gas conversion apparatus as claimed in claim 17, wherein the exhaust gas conversion apparatus is canned in a metal container in a state where a holding sealing member is provided at an outer peripheral part of the exhaust gas conversion apparatus.

19. The exhaust gas conversion apparatus as claimed in claim 17, further comprising:
an injection device provided inside a pipe on an upstream side of the honeycomb structural body and configured to inject ammonia or a compound that generates ammonia by being decomposed.

20. The exhaust gas conversion apparatus as claimed in claim 19, wherein the injection device is an injection nozzle.

21. The exhaust gas conversion apparatus as claimed in claim 19, wherein the ammonia or the compound that generates ammonia by being decomposed is urea water.

22. The exhaust gas conversion apparatus as claimed in claim 17, wherein a ratio of the average particle diameter of the primary particles of the phosphate group zeolite with respect to the average particle diameter of the secondary particles of the β type zeolite is approximately 0.25 or more and approximately 4.0 or less.

23. The exhaust gas conversion apparatus as claimed in claim 22, wherein the ratio of the average particle diameter of the primary particles of the phosphate group zeolite with respect to the average particle diameter of the secondary particles of the β type zeolite is approximately 0.8 to approximately 1.2.

24. The exhaust gas conversion apparatus as claimed in claim 17, wherein the phosphate group zeolite is SAPO (silico-aluminophosphate).

25. The exhaust gas conversion apparatus as claimed in claim 17, wherein the SAPO is SAPO-34.

26. The exhaust gas conversion apparatus as claimed in claim 17, wherein at least one of the β type zeolite and the phosphate group zeolite is obtained by ion-exchange with a copper ion, an iron ion or a combination of a copper ion and an iron ion.

27. The exhaust gas conversion apparatus as claimed in claim 17, wherein the inorganic binder includes a solid containing alumina sol, silica sol, titania sol, soluble glass, sepiolite, attapulgite, boehmite or a mixture thereof.

28. The exhaust gas conversion apparatus as claimed in claim 17, wherein the honeycomb unit includes an inorganic fiber, a scale-like material, a tetrapod-shaped material, a three-dimensional needle-shaped material or a combination thereof.

29. The exhaust gas conversion apparatus as claimed in claim 28, wherein
the inorganic fiber includes alumina fiber, silica fiber, silicon carbide fiber, silica alumina fiber, glass fiber, potassium titanate fiber, aluminum borate fiber or a combination thereof,
the scale-like material includes glass, muscovite, alumina, silica or a combination thereof,
the tetrapod-shaped material includes zinc oxide, and
the three-dimensional needle-shaped material includes alumina, silica, silicon carbide, silica alumina, glass, potassium titanate, aluminum borate, boehmite or a mixture thereof.

30. The exhaust gas conversion apparatus as claimed in claim 17, wherein the honeycomb structural body includes a plurality of the honeycomb units.

31. The exhaust gas conversion apparatus as claimed in claim 30, wherein each of the plural honeycomb units has a cross-section perpendicular to the longitudinal direction of the honeycomb unit that is substantially a fan-shape having a central angle of approximately 90°.

32. The exhaust gas conversion apparatus as claimed in claim 17, wherein the honeycomb structural body has a single honeycomb unit.

33. The exhaust gas conversion apparatus as claimed in claim 17, wherein the average particle diameter of the primary particles included in the β type zeolite is approximately 0.01 μm to approximately 0.1 μm.

34. The exhaust gas conversion apparatus as claimed in claim 17, wherein the phosphate group zeolite is a SAPO, a MeAPO (metal aluminophosphate), or a MeAPSO (metallo-aluminosilicophospate).

35. The exhaust gas conversion apparatus as claimed in claim 34, wherein the SAPO is SAPO-5, SAPO-11, or SAPO-34.

36. The exhaust gas conversion apparatus as claimed in claim 17, wherein a ratio of a mass of the phosphate group zeolite with respect to a total mass of the β type zeolite and the phosphate group zeolite is approximately 15% to approximately 25%.

* * * * *